United States Patent
Bhide et al.

(10) Patent No.: US 12,315,284 B2
(45) Date of Patent: May 27, 2025

(54) PREVENTING CARPAL TUNNEL SYNDROME

(71) Applicant: International Business Machines Corporation, Armonk, NY (US)

(72) Inventors: Manish Anand Bhide, Hyderabad (IN); Anoop T Puthiyaveetil, Bangalore (IN); Pinky Chaudhary, Gandhidham (IN); Madan K Chukka, Hyderabad (IN); Phani Kumar V. U. Ayyagari, Hyderabad (IN); Ravi Shankar Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 18/053,773

(22) Filed: Nov. 9, 2022

(65) Prior Publication Data
US 2024/0153300 A1    May 9, 2024

(51) Int. Cl.
*G06V 40/10*    (2022.01)
*G06V 10/82*    (2022.01)

(52) U.S. Cl.
CPC ............ *G06V 40/107* (2022.01); *G06V 10/82* (2022.01); *G06V 2201/07* (2022.01)

(58) Field of Classification Search
CPC ... G06V 40/107; G06V 10/82; G06V 2201/07
See application file for complete search history.

(56) References Cited

U.S. PATENT DOCUMENTS

| | | |
|---|---|---|
| 9,808,208 B1 | 11/2017 | Erman |
| 2015/0272504 A1 | 10/2015 | Giancardo |
| 2017/0296099 A1* | 10/2017 | Hancock ............... A61B 5/11 |
| 2020/0103962 A1* | 4/2020 | Burns ................. G06F 3/011 |
| 2021/0124427 A1 | 4/2021 | Choate |
| 2021/0236044 A1 | 8/2021 | Arroyo-Gallego |
| 2021/0401361 A1* | 12/2021 | Zarfam ............ A61B 5/7267 |
| 2022/0058529 A1 | 2/2022 | Dibia |
| 2023/0214458 A1* | 7/2023 | Marsden ............. G06V 40/28 382/157 |

OTHER PUBLICATIONS

"Redefining the approach to neurological disorders", NeuroDetect, downloaded from the Internet on Oct. 4, 2022, 3 pages, <https://www.neurodetect.com/>.
"180 Degree Security Camera 4K Video Surveillance", Youtube, Mar. 16, 2020, 5 pages, <https://youtu.be/wFiqYa-5Rh0>.
(Continued)

*Primary Examiner* — David F Dunphy
(74) *Attorney, Agent, or Firm* — Kelsey Skodje (57) ABSTRACT

Disclosed aspects include computer-implemented method for preventing Carpal Tunnel Syndrome (CTS), a computer program product, and a laptop computer. One embodiment of the method may comprise collecting, by a device having an associated keyboard, data of a user's interaction with the keyboard. The method may further comprise analyzing, by a first machine learning model, the audiovisual data to identify ergonomic issues in the user's interaction with the keyboard. The method may further comprise notifying the user of the identified ergonomic issues in real time.

20 Claims, 4 Drawing Sheets

(56) References Cited

OTHER PUBLICATIONS

"Accelerate Digital Biomarker", nQ Medical, downloaded from the Internet on Oct. 6, 2022, 6 pages, <https://www.nq-medical.com/>.
"Best Mouses for Carpal Tunnel, Arthritis, Tendonitis, RSI, & Wrist Pain", Feb. 16, 2017, the Revisionist.Org, 11 pages, <https://www.therevisionist.org/reviews/best-mouse-carpal-tunnel-arthritis-tendonitis-rsi-repetitive-strain-injury/>.
"Can you avoid carpal tunnel syndrome?", Harvard Health Publishing, Aug. 19, 2014, 8 pages, <https://www.health.harvard.edu/pain/can-you-avoid-carpal-tunnel-syndrome>.
"Carpal tunnel syndrome—causes, symptoms, diagnosis, treatment & pathology", Oct. 24, 2016, YouTube, 4 pages, <https://youtu.be/cEO5YG8Y554>.
"Carpal Tunnel Syndrome | Nucleus Health", Apr. 10, 2015, YouTube, 7 pages, <https://youtu.be/z-SeJh5-nOo>.
"Carpal Tunnel Syndrome Fact Sheet", National Institute of Neurological Disorders and Stroke, downloaded from the Internet on Oct. 4, 2022, 5 pages, <https://www.ninds.nih.gov/carpal-tunnel-syndrome-fact-sheet>.
"How Do I Know If I Have Carpal Tunnel Syndrome?", Jan. 2, 2019, YouTube, 7 pages, <https://youtu.be/nZhIT-XU2Uc>.
"How to speed up or slow down a keyboard", Which Computing Helpdesk, downloaded from the Internet on Oct. 4, 2022, 3 pages, <https://computing.which.co.uk/hc/en-gb/articles/115002584785-How-to-speed-up-or-slow-down-a-keyboard>.
"NeuroDetect", App, the University of Michigan Designed for iPhone, downloaded from the Internet on Oct. 4, 2022, 3 pages, <https://apps.apple.com/us/app/neurodetect/id1457083267>.
"NeuroQWERTY", Biblio, downloaded from the Internet on Oct. 6, 2022, 1 page, <https://neuroqwerty.mit.edu/biblio>.
"NeuroQWERTY", MIT, downloaded from the Internet on Oct. 4, 2022, 2 pages, <https://neuroqwerty.mit.edu/>.
"NeuroQWERTY: a Transparent Patient-centered Outcome Method to Quantify Parkinsonian Motor Signs for Drug Trials (neuroQWERTY)", ClinicalTrials.gov, U.S. National Library of Medicine, ClinicalTrials.gov Identifier: NCT02522065, Last Updated Posted Apr. 4, 2019, 7 pages, <https://clinicaltrials.gov/ct2/show/NCT02522065>.
What is Parkinson's disease? | Nervous system diseases |NCLEX-RN | Khan Academy, May 15, 2015, Youtube, 6 pages, <https://youtu.be/3n8UjH9h_8l>.
Arroyo-Gallego et al., "Detection of Motor Impairment in Parkinson's Disease via Mobile Touchscreen Typing", IEEE Transactions on Biomedical Engineering, vol. 64, No. 9, Sep. 2017, 9 pages.
Daluiski, Dr. Aaron, "Here's How to Position Your Hands When You Use a Computer so They Don't Hurt", HSS, Business Insider—Mar. 16, 2016, 2 pages, <https://www.hss.edu/newsroom_aaron-daluiski-on-proper-keyboard-hand-placement.asp>.
Di Leo, Dr. Gerard, "Is your Computer Giving You Carpal Tunnel Syndrome?", Ergonomics Health Association, downloaded from the Internet on Oct. 4, 2022, 9 pages, <https://ergonomicshealth.com/carpal-tunnel-syndrome/>.
Fujita et al., "A Tablet-Based App for Carpal Tunnel Syndrome Screening: Diagnostic Case-Control Study", JMIR Mhealth Uhealth 2019; 7(9):e14172 doi: 10.2196/14172, 11 pages.
Knight, Helen, "Monitoring Parkinson's symptoms at home", MIT News, Oct. 5, 2016, 6 pages, <https://news.mit.edu/2016/keyboard-monitoring-parkinsons-symptoms-1005>.
Papandrea, Dawn, "Best Ergonomic Keyboards to Reduce All-Day Typing Strain", Healthy Living, Reviewed May 21, 2018, 16 pages, <https://www.everydayhealth.com/products/reviews/best-ergonomic-keyboards/>.
Wei et al., "Towards Diagnosis of Carpal Tunnel Syndrome Using Machine Learning", In 2020 3rd Artilcial Intelligence and Cloud Computing Conference (AICCC 2020), Dec. 18-20, 2020, Kyoto, Japan, ACM, New York, NY, USA, 7 pages, <https://doi.org/10.1145/3442536.3442549>.

\* cited by examiner

PREVENTING CARPAL TUNNEL SYNDROME

BACKGROUND

The present disclosure relates to safety equipment, and more specifically, to a method for preventing and/or treating carpal tunnel syndrome (CTS) by automatically warning of prolonged and/or repetitive operations that cause pressure on the median nerve.

CTS is a common medical condition that may cause pain, numbness, and tingling in the hand and/or arm. The condition may occur when one of the major nerves to the hand (i.e., the median nerve) is squeezed or compressed as it travels through the wrist. This condition commonly afflicts people who are above forty years of age whose work involves bending of the wrist. Some examples of such professions include assembly line workers, especially those who work with vibrating tools; cooks who cut vegetables, etc., and perform other activities involving repeated wrist movements; laptop users who type for long durations; and teachers who frequently write on dry erase boards. Some health organizations have also expressed concern that students may also be at-risk, as many are increasingly dependent on laptops for their day-to-day classes, assignments, homework, etc.

SUMMARY

According to embodiments of the present disclosure, a computer-implemented method for preventing carpal tunnel syndrome (CTS), comprising collecting, by a device having an associated keyboard, data of a user's interaction with the keyboard. The method may further comprise analyzing, by a first machine learning model, the audiovisual data to identify ergonomic issues in the user's interaction with the keyboard. The method may further comprise notifying the user of the identified ergonomic issues in real time.

According to embodiments of the present disclosure, a computer program product comprising a computer readable storage medium having a plurality of instructions stored thereon, which, when executed by a processor, cause the processor to perform operations. The operations may comprise collecting video data of a user's interaction with a keyboard and collecting text input data of the user's interaction with the keyboard. The collecting may include identifying one or more typographic errors in the text input data using an autocorrection history. The operations may further comprise analyzing, by a first machine learning model, the video data to generate an ergonomics score indicative of an improper wrist position for a prolonged duration. In response to the ergonomics score being above a first predetermined threshold, the operations may include notifying the user of an ergonomic issue, analyzing, by a second machine learning model, the text input data to calculate a numbness score for the user, and in response to the numbness score being greater than a second predetermined threshold, advising the user to seek medical attention.

According to embodiments of the present disclosure, a laptop computer, comprising a keyboard, a camera adapted to capture video of a user interacting with the keyboard; and a memory. The memory may comprise instructions which, when executed by the one or more processors, cause the one or more processors to analyze, by a first machine learning model, the captured video to identify ergonomic issues in the user's interaction with the keyboard; and notify the user of the identified ergonomic issues in real time.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to safety equipment, and more specifically, to a method for preventing and/or treating carpal tunnel syndrome (CTS) by automatically warning of prolonged and/or repetitive operations that cause pressure on the median nerve.

One of the most effective ways to prevent early CTS is to limit prolonged or repetitive flexing of the wrist. Early detection of CTS symptoms may allow many people to avoid serious medical interventions, such as pain medications, physical therapy, corticosteroid injections, and even surgery. Unfortunately, conventional diagnosis of CTS requires expensive equipment normally only found in hospitals. As a result, few people undergo testing unless they already have significant medical concerns, e.g., they are experiencing noticeable numbness.

Accordingly, one aspect of the present disclosure includes an intelligent image processing pipeline to automatically and continuously detect ergonomic flaws associated with CTS. Some embodiments may include an intelligent method to proactively identify keying patterns suggestive of early CTS symptoms, e.g., numbness and/or stiffness of a user's fingers. This may include analyzing a typing speed and/or typing rhythm and/or history of typographical errors using a machine learning model. These methods and systems may be integrated with one or more software applications and/or operating systems of a computer device.

Some embodiments may apply these systems and methods to encourage users to interact with their personal computers, laptops, tablets, etc., in an ergonomically safe manner. Some embodiments may generate an ergonomic score related to how closely the user conforms to the proper ergonomic form and/or how long the user maintains that form. The ergonomic score may be generated by the image processing pipeline from images and/or video that is automatically and continuously captured by the device during ordinary use.

Additionally or alternatively, some embodiments may generate a numbness score related to how numb/stiff the user's fingers are likely to be. In some embodiments, this numbness score may be compared to an earlier numbness score by the user. In other embodiments, it may be compared to scores from similar cohorts (e.g., their age, occupation, etc.). This numbness score may assist in the early detection/diagnosis of CTS, as well as other serious medical issues associated with finger numbness/stiffness, including: (i) nutritional deficiencies, such as those in B vitamins, including B1, B6, and B12; (ii) stroke; (iii) multiple sclerosis; (iv) hand injuries; and (v) brain or spinal cord disorders.

Some embodiments may provide feedback and/or rewards based on the ergonomic score and/or numbness score, such as badges. Some embodiments may allow users to compete with friends and coworkers on the basis of those scores. Additionally or alternatively, if the ergonomics score is lower than a predetermined threshold for a prolonged duration (e.g., a maximum amount of time recommended by medial and/or occupational safety organizations) and/or if the numbness percentage is higher than a predetermined threshold for longer than predetermined amount of time, the user may be alerted to change the position(s) of their hands/arms, to take a short break, to perform some stretches, visit a medial professional, etc.

One feature and advantage of some embodiments is that they may proactively identify early symptoms of CTS, and in some cases, can notify the user of such symptoms before the user is even consciously aware of those symptoms. In this way, some embodiments may trigger the user to get treatment at an early stage and/or to limit future damage. Another feature and advantage of some embodiments is that they can nudge a user to adjust their behavior and/or ergonomics to avoid future damage and/or treat mild CTS symptoms in a cost-effective manner. Another feature and advantage of some embodiments is that no additional hardware or other special devices are required. That is, some embodiments of the invention may utilize cameras and processing capabilities already built into conventional laptop and notebook computer form factors.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
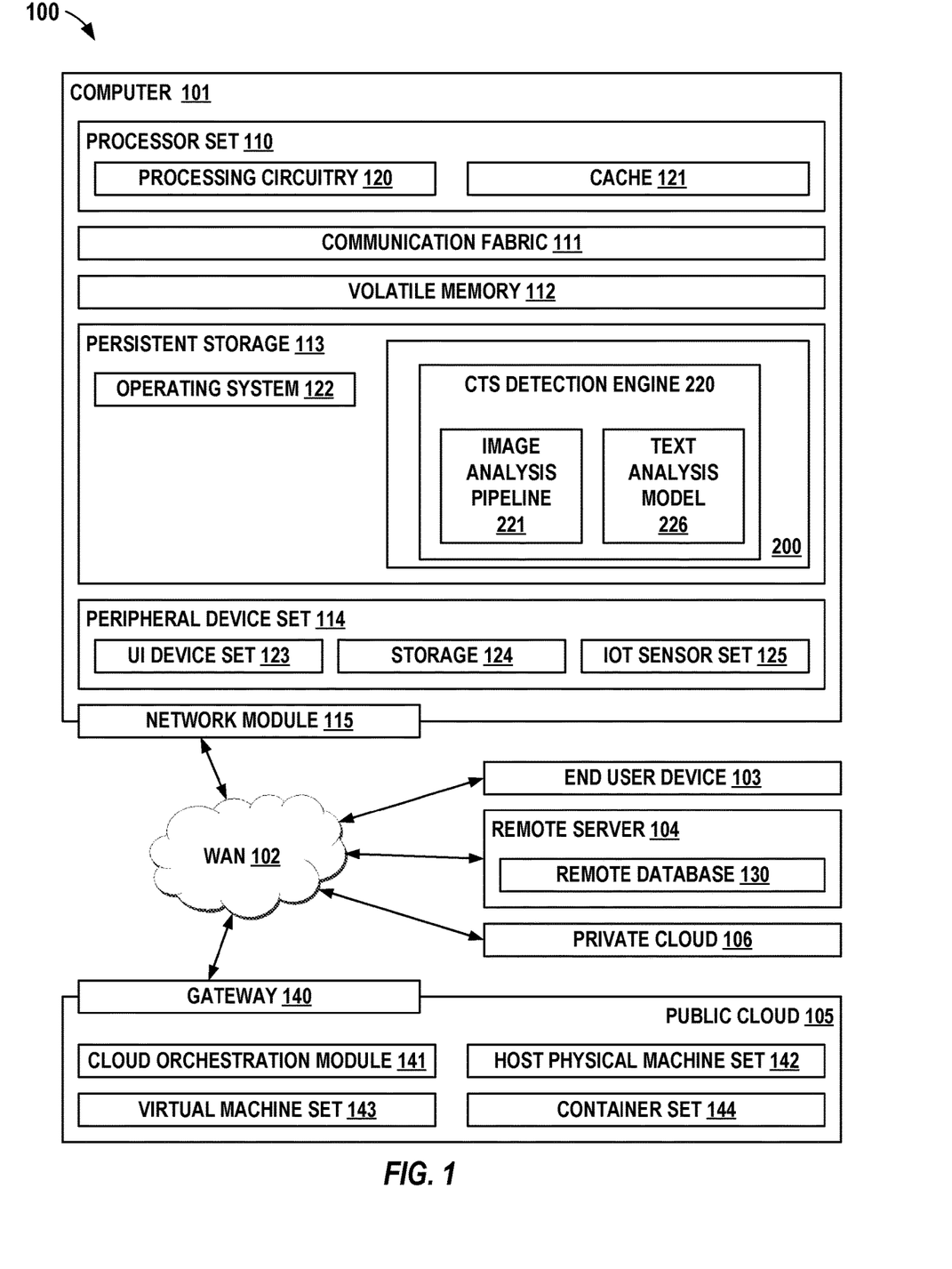
FIG. 1 depicts a computing environment, consistent with some embodiments.

Computing environment 100 contains an example of an environment for the execution of at least some of the computer code 200 involved in performing the inventive methods, such as a CTS detection engine 220, an image analysis pipeline 221, and a text analysis model 226, described in more detail below. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
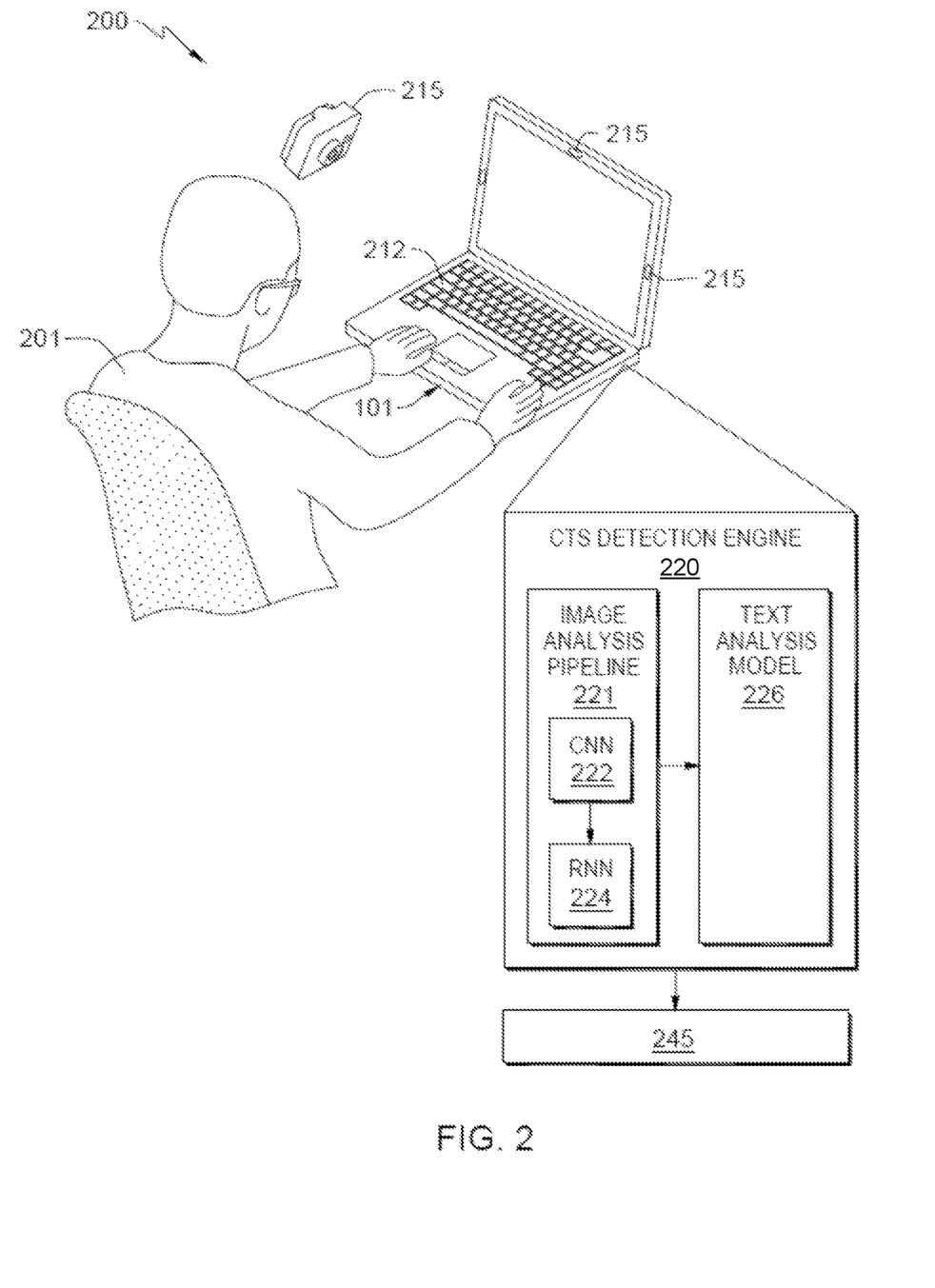
FIG. 2 is a diagram illustrating a system for preventing CTS, consistent with some embodiments.

FIG. 2 is a diagram illustrating a system 200 for preventing CTS, consistent with some embodiments, that may operate, for example, within the computing environment 100. The system 200 in FIG. 2 is described with reference to use of a computer, such as the computer 101, which may be a laptop or tablet equipped with one or more cameras 215. These cameras 215 may be inbuilt capture devices focused on a keyboard 212 of the computer 101. Alternatively, these cameras 215 may comprise a single, wide-angle camera that can both record a user 201 for e.g., video conferencing, and can record the movement of the user's 201 arms/wrists for the CTS analysis methods described herein. Additionally or alternatively, these cameras 215 may comprise one or more externally mounted wide-angle image capture devices. The computer 101 in FIG. 2 may comprise a CTS detection engine 220. The CTS detection engine 220 may comprise an image analysis pipeline 221 and a text analysis model 226.

In operation, the cameras 215 may automatically and continuously record a user's 201 movements during their normal, everyday use of the computer 101, e.g., while composing an email mail, writing a word processing document, etc., as a series of images and/or frames of video. This may include real-time capture of the user's wrist placement and/or wrist movements on the keyboard 212 of the computer 101 (or an external keyboard) from one or more different angles. Advantageously, no special test-taking operations or sets-of-movements are required in this embodiment.

Some embodiments may initially capture the full scope of the output of camera(s) 215, then may automatically filter out everything other than the user's 201 hand movements i.e., may isolate the user's 201 hand movements. The captured and filtered images and/or frames of video may be tagged with their respective user identifiers and capture times, and then stored as a session. Some embodiments may also simultaneously capture text input data using, e.g., a keylogger or operating system module, and then add the captured text input data to the session. The text input data in these embodiments may comprise the sequence of keystrokes that the user made and/or the time between each keystroke. The text input data may further include a history of auto-corrections (e.g., corrections of spelling mistakes) made by the intelligence built into one or more applications running on the computer 101. As will be described in more detail below, this text input data may be used to identify error(s) the user 201 made more than once during a session and/or keystroke combination(s) that the user 201 types more slowly than predicted, if any.

The captured images and/or frames of video in the session may be processed substantially in real-time using the image analysis pipeline 221. The image analysis pipeline 221 may use one or more trained machine learning models to perform feature extraction and to determine the position of wrist. In one embodiment, the machine learning models may comprise a combined Convolutional Neural Network (CNN) 222 and Recurrent Neural Network (RNN) 224 hybrid network. The CNN model 222 may generate spatial information about the user's 201 hands and wrists, and the RNN model 224 may generate temporal information about the user's 201 hands, wrists, and/or arms.

More specifically, in some embodiments, the CNN model 222 may be trained to identify a current position and/or angle(s) of the user's hands/wrists in the image/video data that was captured through the camera(s) 215 at different angles with respect to the computer 101 and its keyboard 212. This may be repeated for each captured angle (i.e., by multiple CNN models 222), or the various angles may be analyzed together by a single CNN model 222. The CNN model 222 may be trained using specially instrumented image/video data and/or image/data in which the user's 201 hands/wrists have been manually tagged.

The video and the output(s) of the CNN model(s) 222 may be fed into the RNN model 224. The RNN model 224 may process the output of the CNN model(s) for the current image and/or frame and of at least one previous image and/or frame result (i.e., generated earlier by the RNN model 224). The RNN model 224 may generate an ergonomics score indicative of whether or not the user 201 is currently interacting with the computer 101 using correct ergonomics. That is, the RNN model 224 may generate information about whether the user's 201 current wrist position/movements are ergonomically correct or at-risk of leading to CTS, as well information about how long the user has been in the current positions. The RNN model 224 may be trained using data collected from users 201 who have been diagnosed with CTS and users 201 who have not been diagnosed with CTS.

If the ergonomics score of the image analysis pipeline 221 score is above a predetermined threshold (i.e., indicative of poor ergonomics), then the text analysis model 226 may be triggered for further evaluation of the session data. The text analysis model 226 may generate a numbness score from that text input data in the session indicative of whether or not the user 201 is likely to be currently suffering from numb and/or stiff fingers. The text analysis model 226 may identify mistakes and/or typing rhythms more commonly done by the people suffering from finger stiffness/numbness from the types of spelling mistakes and/or typing rhythms done by a control group (e.g., earlier data from the user or from peer users). For example, "IBMM" is more likely to be an error of "IBM" typed by the people with CTS due to the repeated trailing letter, whereas "IBEM" is more likely to be a simple spelling mistake.

The text analysis model 226 in some embodiments may also comprise a machine learning model adapted to analyze the text input data (e.g., errors, time between letters, etc.) of the user of the computer 101. The text analysis model 226 may be trained on text input data collected during ordinary day-to-day use of the computer system 101 (e.g., drafting a document, drafting emails, etc.) by people suffering from CTS and/or by people were later diagnosed as having CTS, plus a control group comprising text input data collected from people who are not suffering from CTS. The errors may be identified using the history of autocorrections and/or may utilize output from a conventional spelling/grammar checking function.

The text analysis model 226 in other embodiments may comprise a database (not shown) of the most common typing errors made by people by people suffering from CTS and/or by people were later diagnosed as having CTS, as compared to people who are not suffering from CTS. This database may be created by collecting text input data collected during ordinary day-to-day use of the computer system 101 (e.g., drafting a document, drafting emails, etc.) as compared to the control group, and identifying those errors with the highest correlation to CTS status. The text analysis module 226 in still other embodiments may comprise a set of rules embedded into a conventional spelling/grammar checking function that distinguish the type of errors made by people by people suffering from CTS from other common typing mistakes.

In some embodiments, the CTS detection engine 220 may be integrated into the operating system 122 of the computer 101. These embodiments may be desirable because an integrated CTS detection engine 220 may have sufficient access privileges to enable communication between the various system components, such as the camera(s) 215, the keyboard 212, the image analysis pipeline 221, the text analysis model 226, and the spelling/grammar function. The CTS detection engine 220 in some embodiments may also provide a public application programming interface (API) for other applications 245 that require or use user input through the keyboard, e.g., word processor, email client, web browser, etc. These applications 245 may call this API during save/auto save. Additionally, if the application 245 is enabled with its own auto correction functionality, then some embodiments may expect the application 245 to call the API before such auto correction is performed. In this way, when the API is invoked, the CTS detection engine 220 may feed the raw text input data to text analysis model 226 for predictions.

Some embodiments may also allow the images, video, and/or the text input data to be collected across a plurality of different computers 101 (e.g., a laptop, tablet, and smartphone owned by the same user). In some of these embodiments, this feature may be enabled via a common operating system 122 produced by a single vendor. In other embodiments, this feature may be enabled via third-party health applications that are authorized to access health-related OS APIs and to notify users 201.

Figure 3:
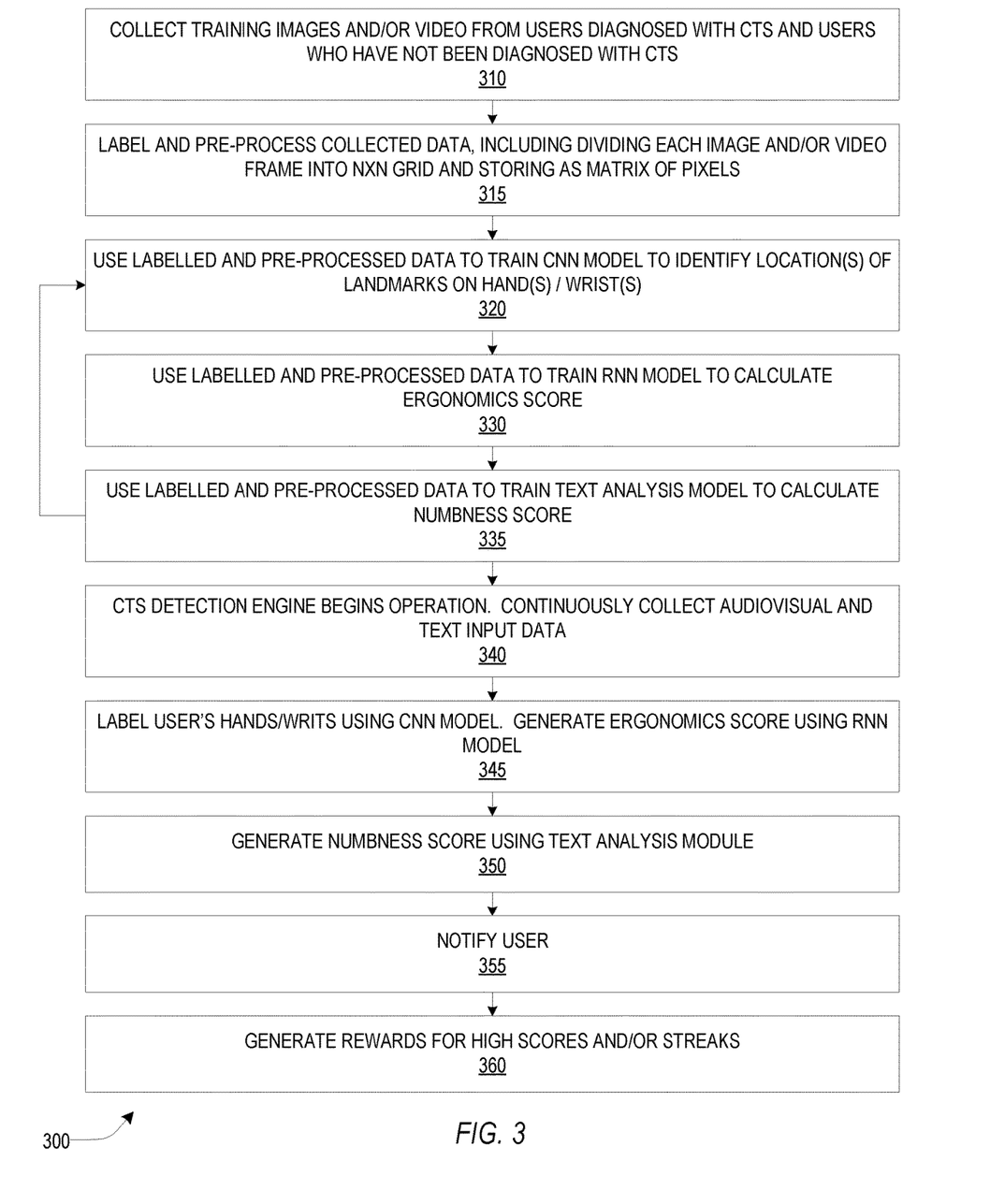
FIG. 3 is a flow chart illustrating one method of preventing CTS, consistent with some embodiments.

FIG. 3 is a flow chart illustrating one method 300 of preventing CTS, consistent with some embodiments. At operation 310, training data comprising images and/or video may be collected from a set (i.e., two or more) of users 201. Some of these users 210 may have been diagnosed with CTS (e.g., in the past or retroactively tagged after a future diagnosis), and some of the users 201 have not been diagnosed with CTS. This training data may also include the output of e.g., a keylogger, for both groups of users, together with information about the time between each keystroke (e.g., timestamps). This training data may also include a history of autocorrections made by the computer 101.

At operation 315, the data may then be labelled and pre-processed for training the CNN model 222. This may include dividing each image and/or video frame into a grid of size N×N and stored as matrix of pixels. The CNN model may then be used at operation 320 to predict the location(s) of landmark(s) on hand(s) and wrist(s). These landmarks may then be used to calculate accurate wrist position, along with other features.

One suitable CNN model 222 may comprise an InceptionV3 type model, which may be trained using transfer learning techniques by retraining using the training data described above. In some embodiments, a last prediction layer may be removed from the CNN model 222 such that the output of the pooling layer may be passed to RNN model 224 (described in more detail below) as a convoluted feature vector of image. This process may also be repeated, such that the CNN model 222 sends a sequence of such frames to the RNN model 224. Those skilled in the art will appreciate, however, that other models capable of convoluting vectors for the user's wrist position via landmark mapping, or otherwise determining the angle of user's wrist, are within the scope of this disclosure.

Next, the RNN model 224 may be trained at operation 330. In some embodiments, the RNN model 224 may comprise an architecture comprising a single long short-term memory (LSTM) layer followed by fully connected Soft-Max layer to predict the output. The RNN model 224 may receive as input both: (i) the current output of the pool layer of the CNN model 222 (e.g., for Inception V3 type models); and (ii) the output of the RNN model 224 for one or more previous images/frames. The RNN model 224 may generate a prediction of whether or not the user's current position is likely to cause CTS. This prediction may be in the form of a score, which may be compared to corresponding tags in the training data. A difference between the score and the tag may be used to update the CNN model 222 and/or the RNN model 224.

Next, the text analysis module 226 may be trained at operation 335. This may include generating a numbness score indicative of whether or not typographical errors and/or typing rhythms produced by the user 201 are suggestive of CTS symptoms, such as finger numbness and/or stiffness. The typing errors, in turn, may be identified using the autocomplete history, or may be identified by using a spell-checking function built into the operating system to analyze the raw keystroke data. During training, the generated numbness score can also be compared to corresponding tags in the training data and used to update the text analysis module 226.

Operations 320-335 may then be repeated until the image analysis pipeline 221 and the text analysis module 226 both achieve a predetermined accuracy level. After training is complete, the CTS detection engine 220 may begin operation using live data. At operation 340, the CTS detection engine 220 may begin continuously collecting audiovisual data about the user's 201 interaction with the keyboard 212, as well as text input data about the user's 201 keystrokes e.g., using a keylogger function. This may include timing information.

At operation 345, the collected image and/or video data may be analyzed by the trained CNN model 222 to identify a current position and/or angle of user's hands/wrists, and then further analyzed by the trained RNN model 224 to generate an ergonomics score. The calculated ergonomics score may be indicative of poor ergonomics that may lead to CTS.

At operation 350, if the ergonomics score is above a predetermined threshold (e.g., positive correlation with poor ergonomics) for more than a predetermined amount of time (e.g., 15, 30, or 45 minutes), the CTS detection engine 220 may trigger the trained text analysis model 226 for further analysis of the session data. The trained text analysis model 226 may analyze the collected text input data to generate a numbness score indicative of whether or not the user is likely suffering from CTS symptoms right now. This may include identifying one or more typographic errors in the text input data using a spell-checking function and correlating the spelling errors with training data from people diagnosed with CTS.

At operation 355, the user 201 may be notified in real time if the ergonomics score from the image analysis pipeline 221 is greater than a first threshold and/or a numbness score from the text analysis module 226 are greater than a second threshold. A positive result from the image analysis pipeline 221 (only) may be used to notify user in real time that their current wrist placement is not correct and, in the future, may lead to CTS issues. A positive result from the text analysis model 226 may be used to alert the user that he/she might have CTS symptoms and should seek medical attention.

At operation 360, the CTS detection engine 220 may use the output of the image analysis pipeline 221 and/or the text analysis module 226 to select one or more rewards to present to the user. These rewards may include one or more virtual badges, such as a "streak" of days in which no ergonomic issues were detected or a "score" indicating how closely the user matched an ideal ergonomic position. In some embodiments, these scores and/or badges may also be published to a pre-approved group of the users 201 friends, e.g., via a social media account (with the user's 201 permission).

Figure 4:
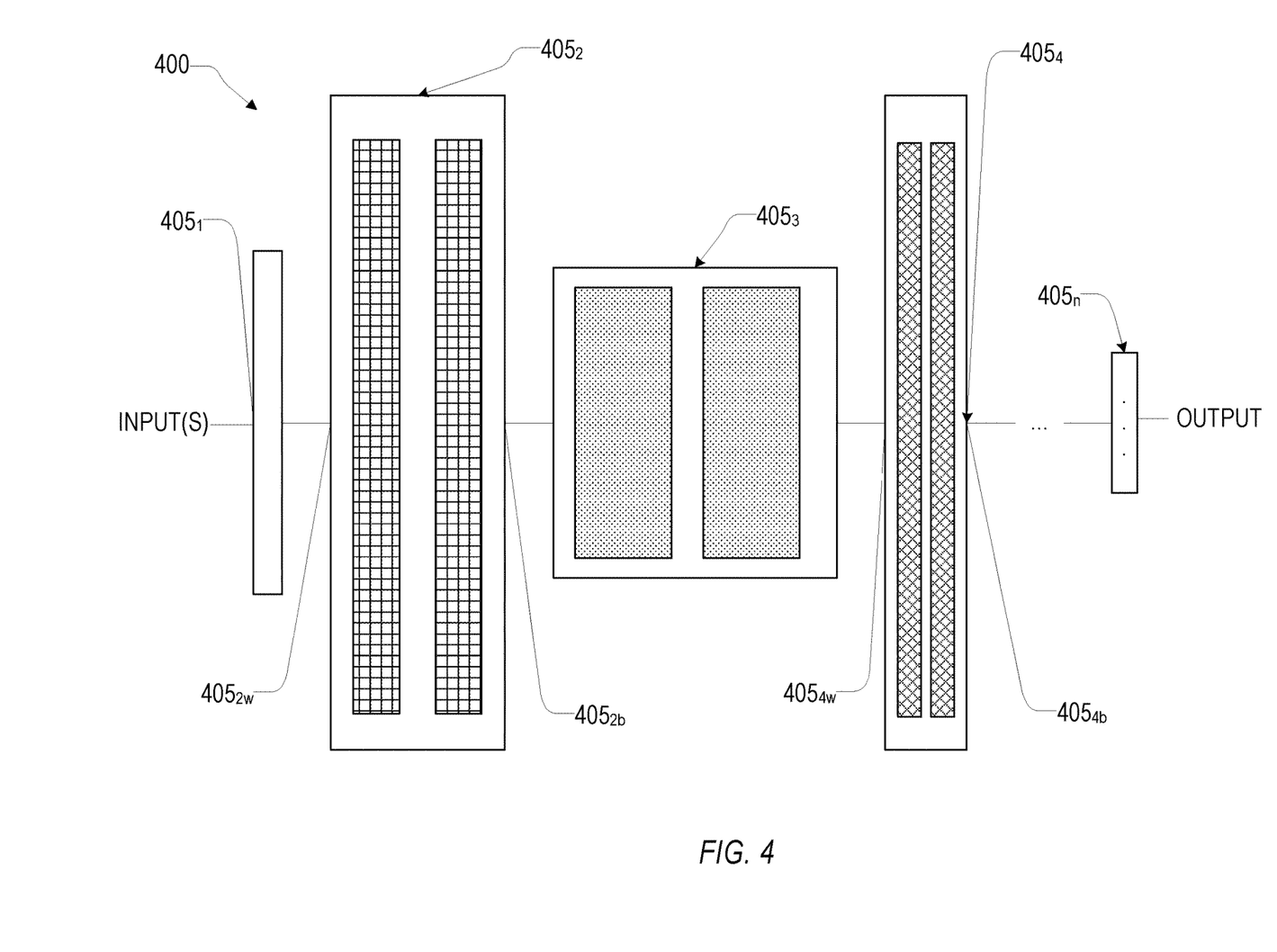
FIG. 4 illustrates an example machine learning model, consistent with some embodiments.

FIG. 4 illustrates an example ML model 400 suitable for use as the CNN 222, the RNN 224, or the text analysis module 226, consistent with some embodiments. The example ML model 400 comprises a plurality of artificial neurons interconnected through connection points called synapses or gates. Each synapse may encode a strength of the connection between the output of one neuron and the input of another. The output of each neuron, in turn, may be determined by the aggregate input received from other neurons that are connected to it, and thus by the outputs of these "upstream" connected neurons and the strength of the connections as determined by the synaptic weights.

The example ML model 400 may be trained to solve a specific problem (e.g., identifying a user's hands/wrists in image and/or video data) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function. In some embodiments, the artificial neurons may be organized into layers. The ML model 400 in some embodiments may utilize a deep learning algorithm, such as deep Q-learning, policy gradient, etc.

In FIG. 4, the ML model 400 comprises a plurality of layers $405_1$-$405_n$. Each of the layers comprises weights $405_{1w}$-$405_{nw}$ and biases $405_{1b}$-$405_{nb}$ (only some labeled for clarity). The layer $405_1$ that receives external data is the input layer. The layer $405_n$ that produces the ultimate result is the output layer. Some embodiments include a plurality of hidden layers $405_2$-$405_{n-1}$ between the input and output layers, and commonly hundreds of such hidden layers. Some of the hidden layers $405_2$-$405_{n-1}$ may have different sizes, organizations, and purposes than other hidden layers $405_2$-$405_{n-1}$. For example, some of the hidden layers in the ML model 400 may be convolution layers, while other hidden layers may be fully connected layers, deconvolution layers, or recurrent layers.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for preventing Carpal Tunnel Syndrome (CTS) comprising:

collecting, by a device having an associated keyboard, video data of a user's interaction with the keyboard;

collecting, by the device, text input data of the user's interaction with the keyboard;

analyzing, by a first machine learning model, the video data to identify ergonomic issues in the user's interaction with the keyboard;

analyzing, by a second machine learning model, the text input data to calculate a numbness score for the user; and notifying the user of the identified ergonomic issues in real time.

2. The computer-implemented method of claim 1, further comprising identifying one or more typographic errors in the text input data using an autocorrection history.

3. The computer-implemented method of claim 1, wherein the device comprises a laptop computer, and wherein the video data is collected by a wide angle camera operably attached to the laptop computer.

4. The computer-implemented method of claim 3, wherein the collecting and analyzing are performed by an application running on an operating system of the laptop computer.

5. The computer-implemented method of claim 1, wherein the ergonomic issue comprises an improper wrist position for a prolonged duration.

6. The computer-implemented method of claim 1, further comprising:
tracking one or more metrics related to proper ergonomic use of the device; and
alerting the user if the one or more metrics exceeds a predetermined value for a predetermined amount of time.

7. The computer-implemented method of claim 1, further comprising training the first machine learning model to identify the ergonomic issues in the user's interaction with the keyboard.

8. The computer-implemented method of claim 7, wherein the training comprises:
capturing video of interaction of a plurality of users with a plurality of keyboards;
generating spatial information about hands and wrists of the plurality of users from the captured video using a convolutional neural network; and
generating temporal information about the hands and wrists of the plurality of users from the captured video using a recurrent neural network.

9. The computer-implemented method of claim 8, wherein the training further comprises generating an ergonomics score from the spatial and temporal information indicative of whether or not the user is using correct ergonomics.

10. The computer-implemented method of claim 8, wherein the plurality of users comprises users who have been diagnosed with CTS and users who have not been diagnosed with CTS.

11. The computer-implemented method of claim 8, wherein the captured video comprises a plurality of frames of video, and wherein generating the spatial information comprises:
dividing each frame into a grid of size N×N; and
predicting location(s) of one or more landmarks on the hands and wrists of the plurality of users.

12. The computer-implemented method of claim 1, further comprising analyzing, by the first machine learning model, the video data to generate an ergonomics score indicative of an improper wrist position for a prolonged duration.

13. The computer-implemented method of claim 12, wherein the analyzing the text input data to calculate the numbness score is in response to the ergonomics score being above a first predetermined threshold.

14. The computer-implemented method of claim 1, further comprising notifying the user of an ergonomic issue in response to the ergonomics score being above a first predetermined threshold.

15. A computer program product comprising a computer readable storage medium having a plurality of instructions stored thereon, which, when executed by a processor, cause one or more processors to perform operations comprising:
collecting video data of a user's interaction with a keyboard;
collecting text input data of the user's interaction with the keyboard, wherein the collecting includes identifying one or more typographic errors in the text input data using an autocorrection history;
analyzing, by a first machine learning model, the video data to generate an ergonomics score indicative of an improper wrist position for a prolonged duration;
in response to the ergonomics score being above a first predetermined threshold:
notifying the user of an ergonomic issue;
analyzing, by a second machine learning model, the text input data to calculate a numbness score for the user; and
in response to the numbness score being greater than a second predetermined threshold, advising the user to seek medical attention.

16. A laptop computer, comprising:
a keyboard;
a camera adapted to capture video of a user interacting with the keyboard; and
a memory, wherein the memory comprises instructions which, when executed by one or more processors, cause the one or more processors to:
analyze, by a first machine learning model, the captured video to identify ergonomic issues in the user's interaction with the keyboard;
collect text input data of the user's interaction with the keyboard;
analyze, by a second machine learning model, the text input data to calculate a numbness score for the user; and
notify the user of the identified ergonomic issues in real time.

17. The laptop computer of claim 16, wherein the ergonomic issue comprises an improper wrist position for a prolonged duration.

18. The laptop computer of claim 16, wherein the memory further comprises instructions to:
track one or more metrics related to proper ergonomic use of the keyboard; and
provide feedback to the user conditioned upon the one or more metric exceeding a predetermined value for a predetermined amount of time.

19. The laptop computer of claim 16, wherein the memory further comprises instructions to:
generate spatial information about hands and wrists of the user from the captured video using a convolutional neural network; and generate temporal information about the hands and wrists of the user from the captured video using a recurrent neural network.

20. The laptop computer of claim 19, wherein the memory further comprises instructions to generate an ergonomics score from the spatial and temporal information indicative of whether or not the user is currently typing using correct ergonomics.

* * * * *